US007220479B2

(12) United States Patent
Lutz et al.

(10) Patent No.: US 7,220,479 B2
(45) Date of Patent: May 22, 2007

(54) MULTILAYER BODY WITH A LAYER HAVING AT LEAST ONE LASER-SENSITIVE MATERIAL

(75) Inventors: Norbert Lutz, Rückersdorf (DE); Gerhard Zinner, Pyrbaum (DE); Matthias Schumacher, Borchen (DE); Ulrich Knaack, Paderborn (DE); Dirk Fischer, Paderborn (DE)

(73) Assignees: Leonard Kurz GmbH & Co., KG, Furth (DE); Orga Systems GmbH, Paderborn (DE)

( * ) Notice: Subject to any disclaimer, the term of this patent is extended or adjusted under 35 U.S.C. 154(b) by 89 days.

(21) Appl. No.: 10/513,623

(22) PCT Filed: May 8, 2002

(86) PCT No.: PCT/DE02/01676

§ 371 (c)(1),
(2), (4) Date: Jan. 5, 2005

(87) PCT Pub. No.: WO03/095225

PCT Pub. Date: Nov. 20, 2003

(65) Prior Publication Data

US 2005/0181498 A1 Aug. 18, 2005

(51) Int. Cl.
*B32B 5/16* (2006.01)

(52) U.S. Cl. ...................... 428/323; 428/326; 428/327; 428/328; 235/487; 235/494; 156/272.8

(58) Field of Classification Search ................ 428/323, 428/326, 327, 328; 235/487, 434; 156/277.8
See application file for complete search history.

(56) References Cited

U.S. PATENT DOCUMENTS 6,827,283 B2 * 12/2004 Kappe et al. ............... 235/494

FOREIGN PATENT DOCUMENTS

| | | |
|---|---|---|
| DE | 100 47 450 | 4/2002 |
| EP | 1 022 625 | 7/2000 |

* cited by examiner

*Primary Examiner*—Leszek Kiliman
(74) *Attorney, Agent, or Firm*—Hoffmann & Baron, LLP

(57) ABSTRACT

The present invention relates to a multi-layer body which is a paper document with a hot stamping film embossed thereon. The hot stamping film has a laser-sensitive layer in which a laser-induced color image is produced by laser treatment. Arranged on the document are further security identifications such as a security print, which is in the form of guilloche patterns, fluorescent threads, and a security strip. Water marks are also provided in the paper document.

20 Claims, 10 Drawing Sheets

MULTILAYER BODY WITH A LAYER HAVING AT LEAST ONE LASER-SENSITIVE MATERIAL

CROSS-REFERENCE TO RELATED APPLICATIONS

This application is a National Phase application of International Application No. PCT/DE02/01676 filed May 8, 2002, which is incorporated herein by reference.

BACKGROUND OF THE INVENTION

The invention concerns a multi-layer body comprising a layer composite which is formed with a substrate and which has at least one layer having laser-sensitive material—referred to hereinafter as a laser-sensitive layer.

Multi-layer bodies of that kind can be produced for example using a transfer film, preferably a hot stamping film. It is known for films of that kind to be applied to a plastic body to form an identity card or a code card and for individualisation of the card to be effected by way of a laser treatment of the applied film. Laser-induced markings are produced in the laser-sensitive layer in the laser treatment.

SUMMARY OF THE INVENTION

The object of the invention is to provide a multi-layer body of the kind set forth in the opening part of this specification, which makes it possible to implement particularly exact and varied laser-induced marking. In particular the invention seeks to provide that the unwanted adverse effects which occur in the laser treatment, in further layers or on the substrate of the multi-layer body, are reduced or eliminated. The invention also aims to provide that it is possible to use substrates of paper material.

The invention attains that object with the subject-matter of claim 1.

By virtue of the fact that associated with the laser-sensitive layer is a background layer which reflects preferably to a high degree the laser radiation which impinges in the laser treatment of the laser-sensitive layer, that is to say in the production of the laser-induced markings, or is at least substantially non-transparent for said laser radiation or is at least substantially non-transparent for the non-reflected component of the incident laser radiation, this provides that no laser radiation or at least very little laser radiation is incident in layers beneath the background layer. Additionally or alternatively it can be provided that the background layer is absorbent in respect of the laser radiation so that at least a large part of the non-reflected radiation is absorbed in the background layer. The background layer thus forms a protective layer for layers disposed therebeneath or the substrate. This means that even very laser-sensitive substrates, for example therefore also substrates of paper material, can be readily used. Admittedly, it has been found that the laser-sensitive layer itself already acts as a protective layer for the layers therebeneath and for the substrate, and a large part of the laser radiation which acts in the laser treatment does not completely penetrate the laser-sensitive layer or does not reach the layer disposed therebeneath, and thus prevents serious destruction of the substrate. The background layer however affords substantially increased security so that it is now possible to produce particularly exactly defined and varied laser-induced marking and in addition substantially greater degrees of freedom of design in regard to the configuration of the layer composite are achieved.

Alternatively or additionally the background layer can also be used to achieve a color enhancement or strengthening effect or a brightening effect in respect of the laser-induced marking produced in the laser-sensitive layer disposed thereover. Special brightener substances which produce that effect can also be provided in the background layer.

Preferably the background layer is arranged under the laser-sensitive layer only in a partial region, more specifically advantageously only beneath the region in which the arrangement of the laser-induced marking is intended, that is to say in the delimited partial region of the laser-sensitive layer, in which the laser-induced marking is to be positioned.

Particularly advantageous embodiments provide that a plurality of mutually superposed laser-sensitive layers are provided in the layer composite. In those cases it is advantageous if a background layer is provided in particular between the laser-sensitive layers.

In preferred embodiments it is provided that a transfer or laminating film is applied to the substrate and one or more layers are provided in the film, at least one layer being in the form of the laser-sensitive layer. The background layer can also be provided in the film, but alternatively also as a constituent part of the substrate, for example as a surface layer of the substrate. In other embodiments it is provided that the multi-layer body is laminated from a plurality of overlay films and inlets. At least one of the overlay films can be in the form of the laser-sensitive layer or can have the laser-sensitive layer. It can be for example in the form of a laminating film which is provided with the laser-sensitive layer by way of the application of a hot stamping film.

BRIEF DESCRIPTION OF THE DRAWINGS

Preferred embodiments by way of example are described in greater detail hereinafter with reference to the accompanying Figures in which.

DETAILED DESCRIPTION OF THE INVENTION

Figure 1:
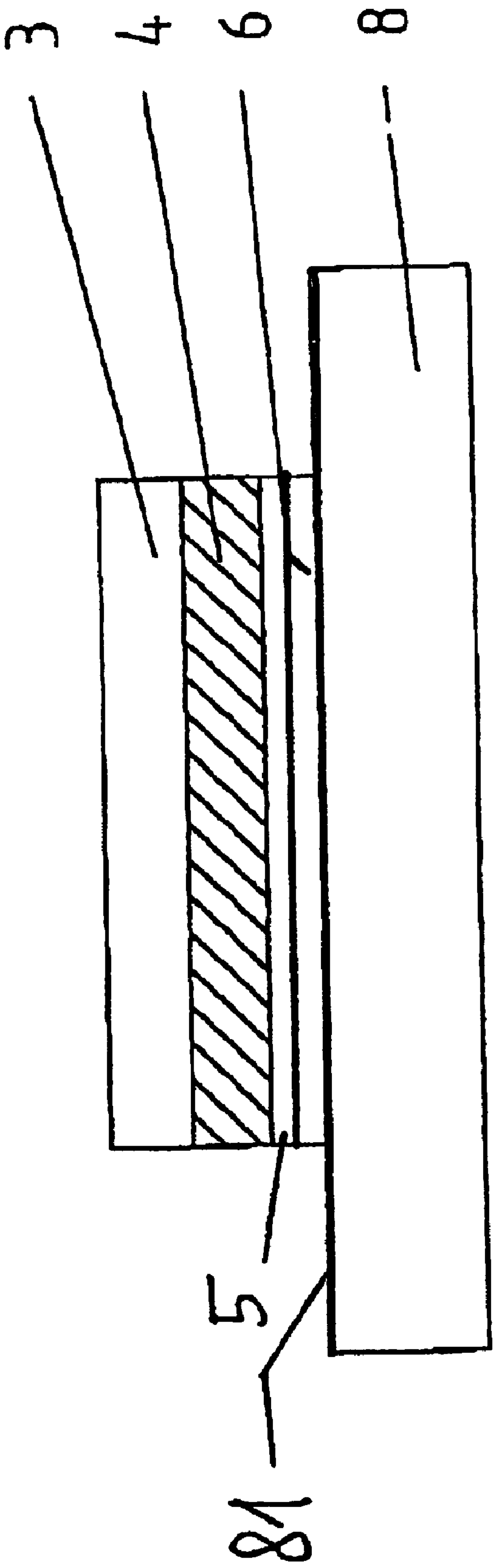
FIG. 1 is a view in section of an embodiment of a multi-layer body comprising a paper material substrate to which a multi-layer film is applied in region-wise manner.
Figure 2:
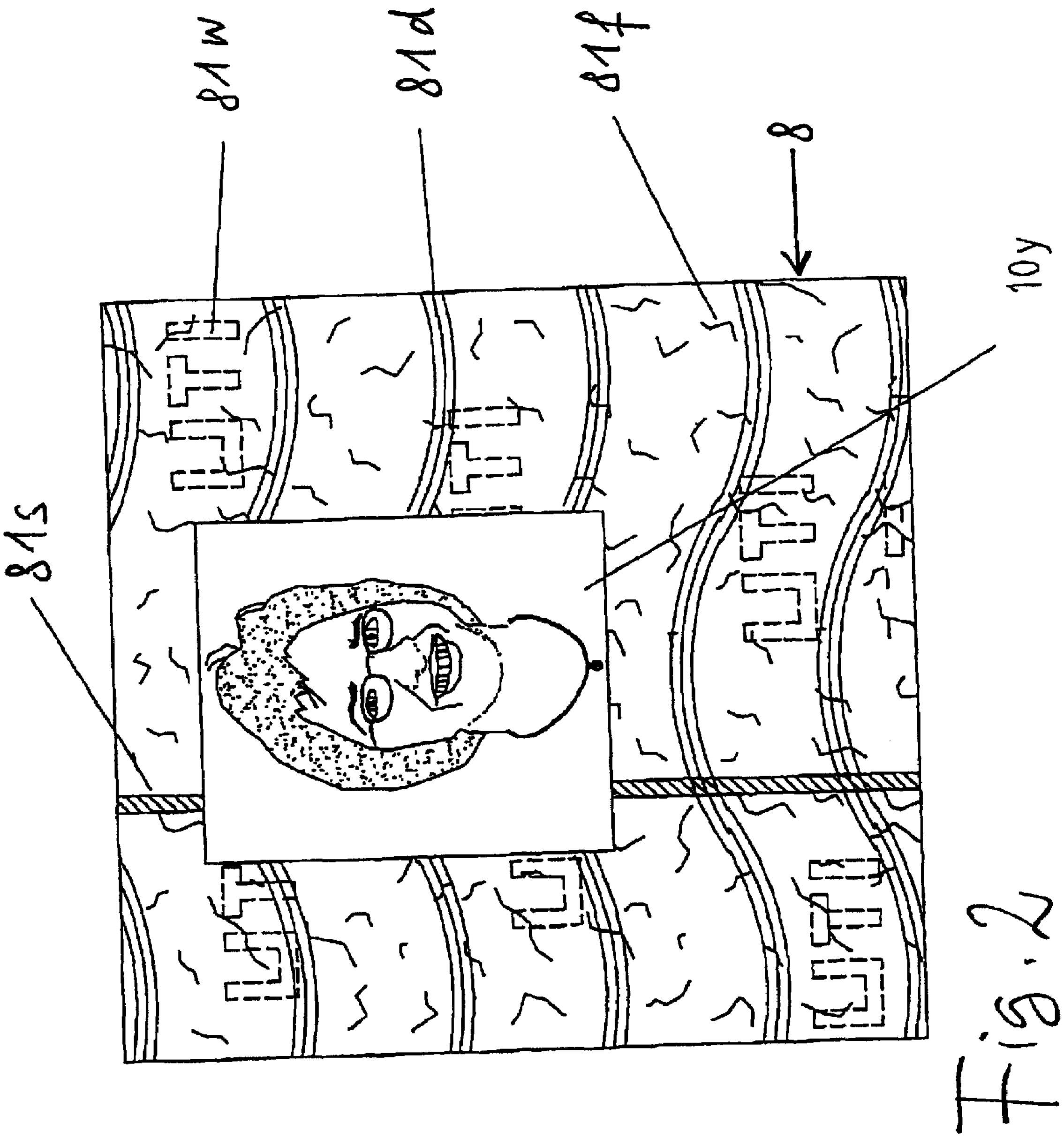
FIG. 2 is a plan view of the embodiment of FIG. 1.

The embodiment illustrated in FIGS. 1 and 2 involves an identity card with various identification signs and individualisation effects, as can be seen from the plan view in FIG. 2. The card body—referred to hereinafter as the card 8—comprises paper material. A multi-layer film is applied to its surface, as can be seen from FIG. 2. As its layers, the film has a protective layer 3, a layer 4 having laser-sensitive material, a background layer 5 and an adhesive layer 6 with which it is glued to the surface of the card 8. The film is arranged exclusively in a partial region of the card 8. It is of a rectangular configuration in plan, as can be seen from FIG. 2. The film can have been applied to the card 8 by way of a transfer process, for example by hot stamping of a hot stamping film. Such a transfer film is shown in section in FIG. 4. The release layer 2 illustrated over the protective layer 3 and the carrier film 1 are detached in the transfer operation which is usually effected under elevated pressure and at elevated temperature.

As can be seen from FIG. 2 provided in the laser-sensitive layer is a laser-induced color image 10*y*. That color image 10*y* can be produced by laser-induced bleaching of the laser-sensitive material of the layer 4. The method of laser-induced bleaching is described in further detail hereinafter. The background layer 5 is provided under the entire region of the laser-sensitive layer 4. That background layer 5 is not transparent in the visible spectral range so that the substrate 8 is covered in that region. As can be seen from FIGS. 1 and 2, provided on the surface of the substrate 8 is an identification mark 81 (see FIG. 1) which is discernible when being viewed from above exclusively in the region outside the color image 10*y* or outside the background layer 5 (see FIG. 2). The identification 81 comprises a security printing 81*d* which in the illustrated embodiment is in the nature of guilloche patterns. Fluorescent threads 81*f* are also arranged in the substrate and on the surface thereof, which reflect upon irradiation with UV-light and which appear as black threads in the visible spectral range. In addition, a water mark 81*w* is provided as a further identification in the substrate 8, together with a security strip 81*s*. The security strip 81*s* can have various identification and individualisation elements, such as for example a diffraction structure and/or a hologram structure, laser-induced markings and so forth. In the illustrated embodiment the security strip 81*s* is incorporated in the substrate 8. It also passes through the substrate beneath the laser-induced color image 10*y* and is not visible there by virtue of the non-transparent background layer 5. The security strip 81*f* is visible only in the region in which it extends beyond the laser-induced image 10*y*.

Figure 3:
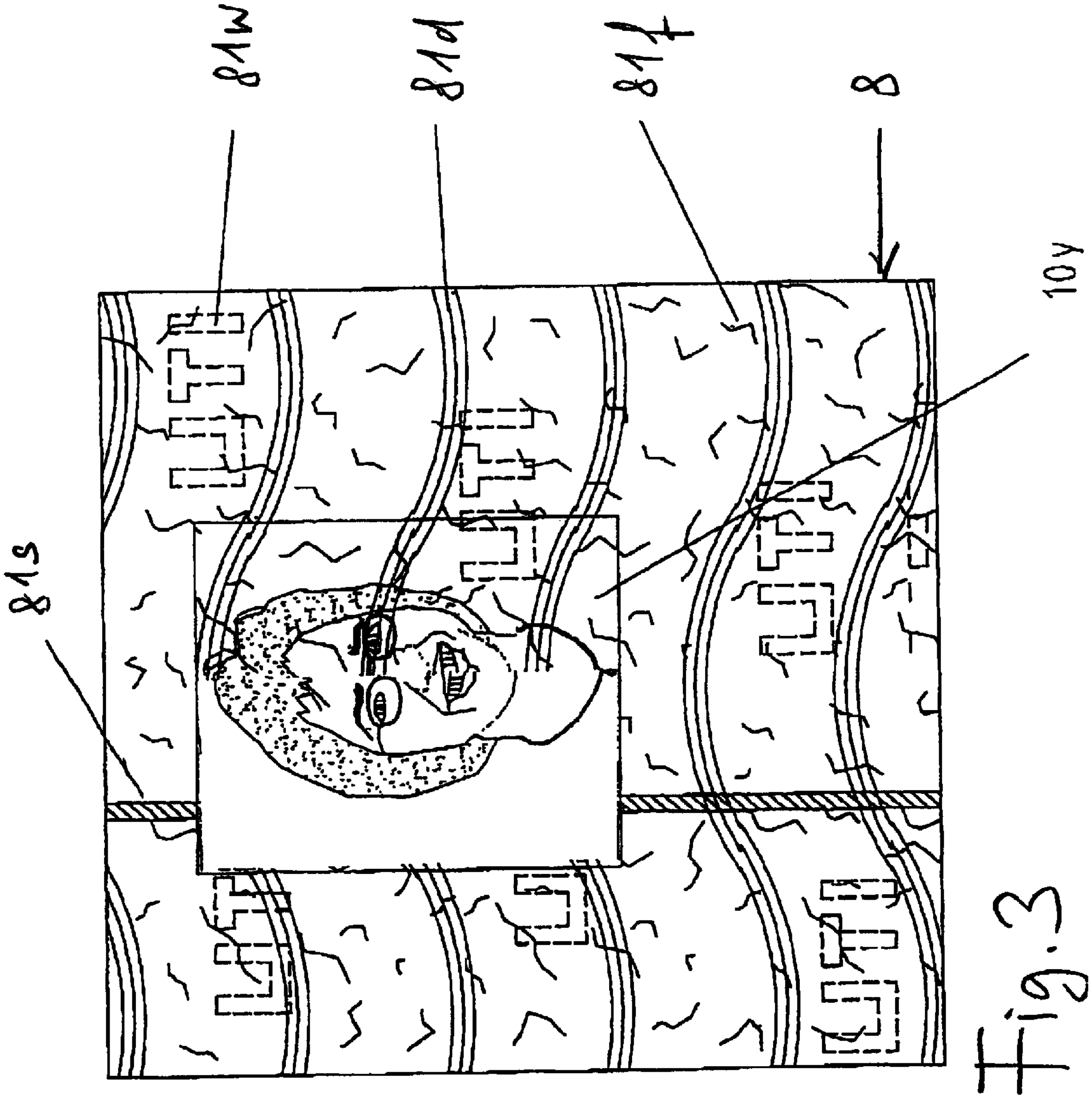
FIG. 3 is a plan view corresponding to FIG. 2 of a modified embodiment.

The embodiment illustrated in FIG. 3 is a modification of the embodiment shown in FIGS. 1 and 2. In this embodiment of FIG. 3, the background layer 5 is provided only in the left-hand half of the laser-induced color image 10*y* so that it is only in that left-hand partial region in which the background layer 5 is provided that the identification 81 on the substrate 8 is covered and is not visible. No background layer 5 is arranged in the remaining region of the laser-induced image 10*y* so that, in that region, the surface of the substrate 8 and therewith the identification 81 are visible through the laser-induced color image which is transparent with a color shading. This embodiment affords a particularly elevated level of safeguard against forgery as the laser-induced image 10*y* co-operates optically in a particularly varied manner with the other identification elements.

Figure 4:
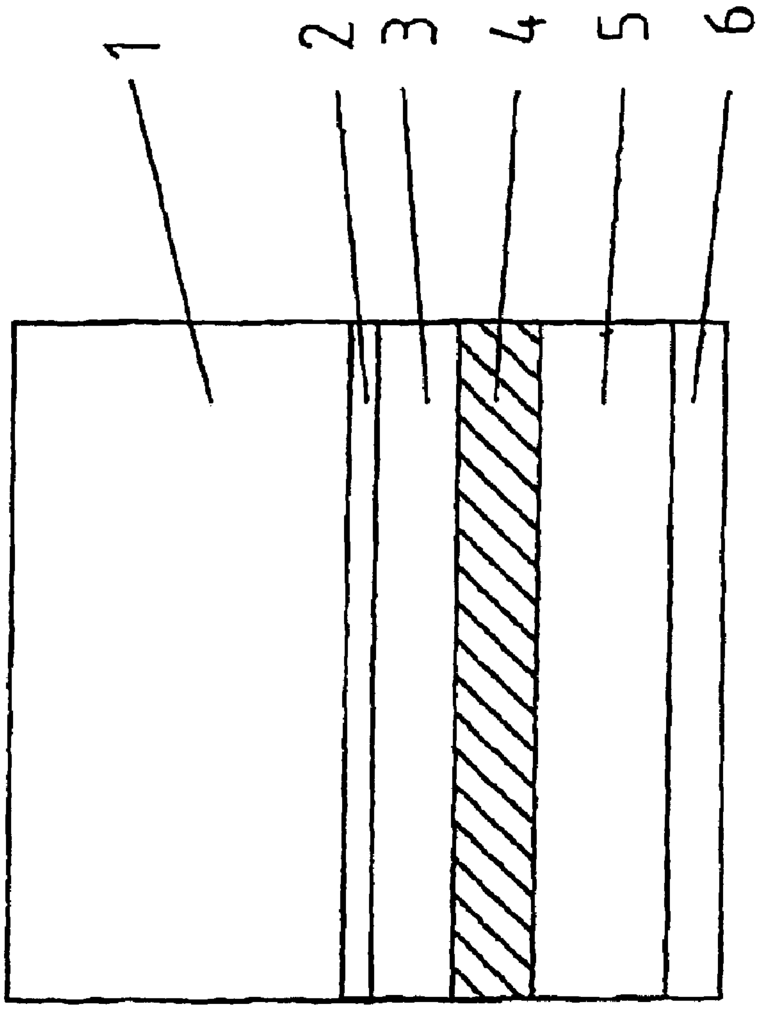
FIGS. 4 to 6 are sectional views of embodiments of transfer films with a laser-sensitive layer and an associated background layer.
Figure 5:
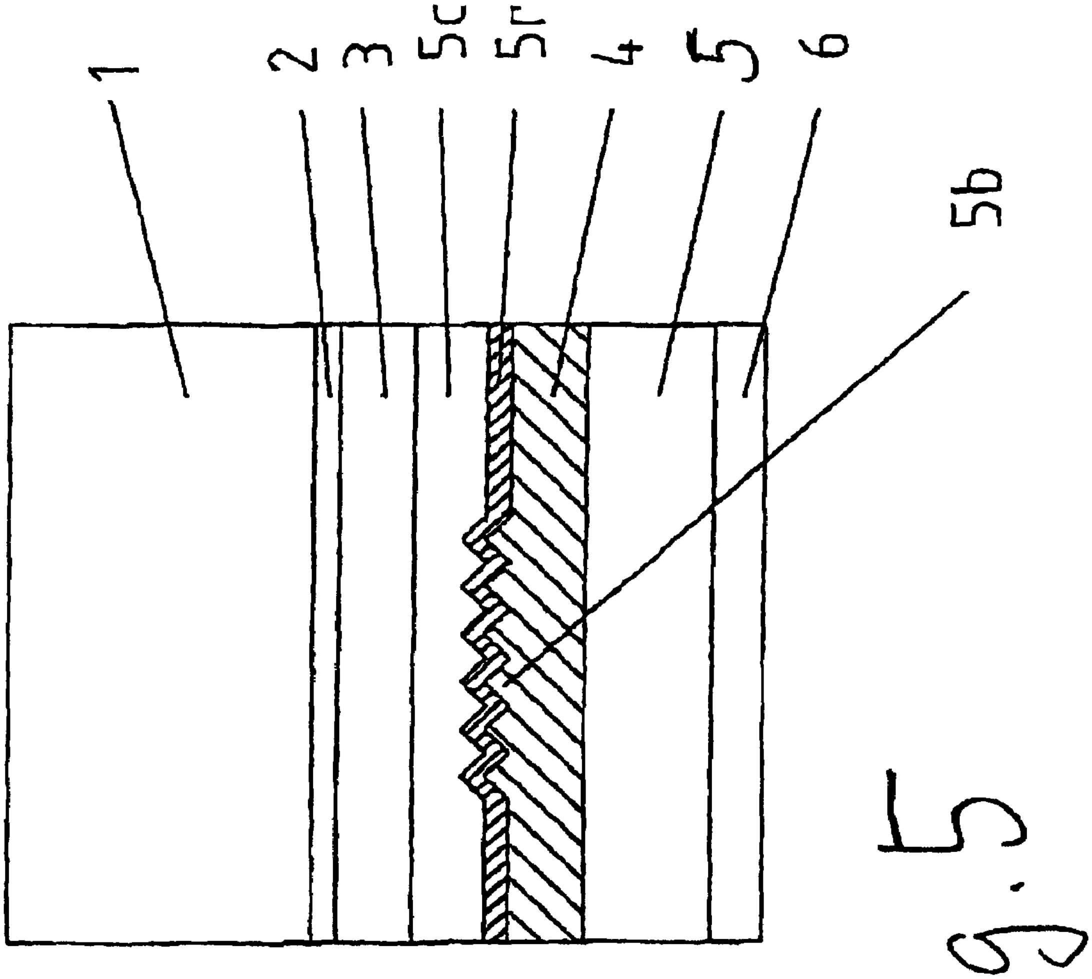
Figure 6:
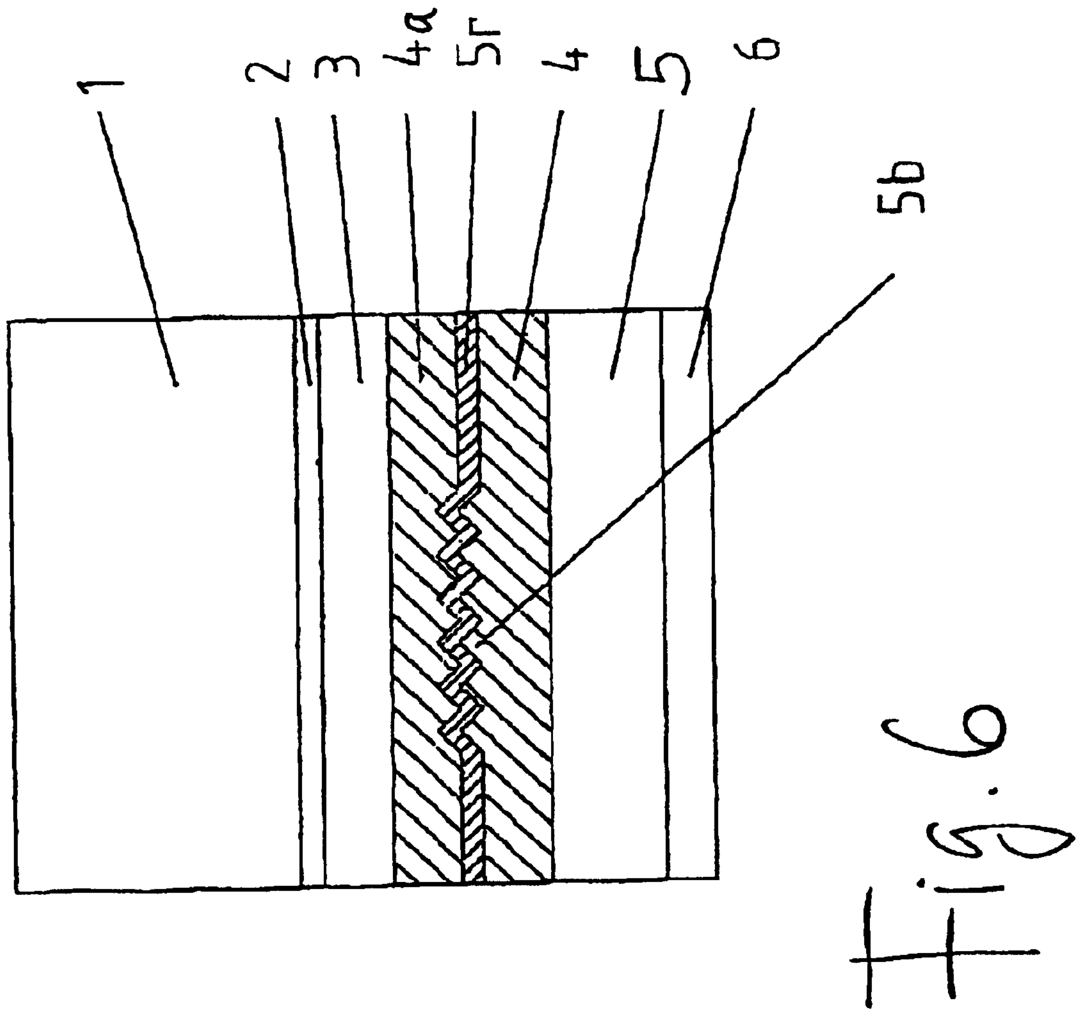

In modified embodiments, diffraction structures and/or hologram structures can also be provided in the film layers. FIGS. 5 and 6 show transfer films which have such a diffraction and/or hologram structure 5*b* in their layer structure. The film in FIG. 5 corresponds in respect of its structure to the film in FIG. 4, in which respect there is only additionally provided an additional lacquer layer 5*c* and a reflection layer 5*r* between the protective layer 3 and the laser-sensitive layer 4. The diffraction and/or hologram structure 5*b* is provided in the region of the lacquer layer 5*c*, the reflection layer 5*r* and the laser-sensitive layer 4. In the embodiment of FIG. 6 the additional lacquer layer 5*c* is in the form of a laser-sensitive layer 4*c*. This embodiment therefore has in addition to the laser-sensitive layer 4 the laser-sensitive layer 4*c*, between which the reflection layer 5*r* extends. The laser-sensitive layers 4 and 4*c* can each be made from the same laser-sensitive material but alternatively they can also be made from two different laser-sensitive materials. In all embodiments illustrated in FIGS. 4 to 6, provided under the laser-sensitive layer 4 on the respective side which faces towards the substrate is the background layer 5 which, as in connection with the embodiments shown in FIGS. 1 to 3, can act as a protective layer in the laser treatment and also as a brightening agent and color strengthener for the laser-induced image.

Figure 7:
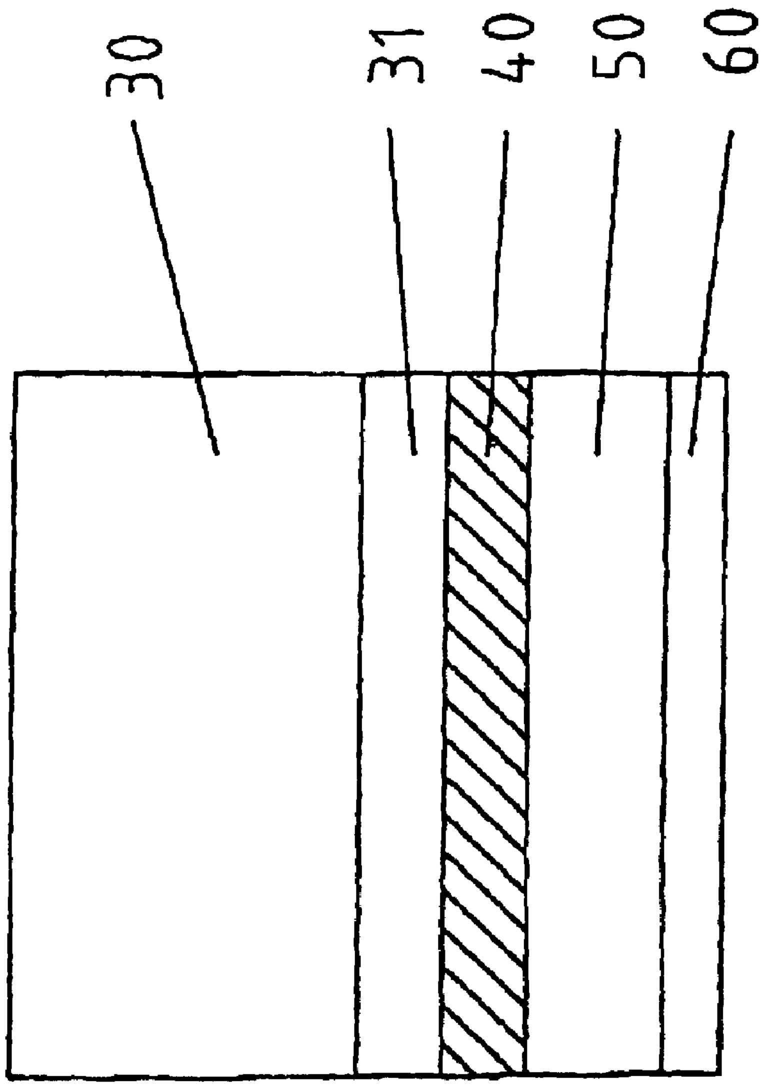
FIGS. 7 to 9 are sectional views of embodiments of laminating films with a laser-sensitive layer and an associated background layer.
Figure 8:
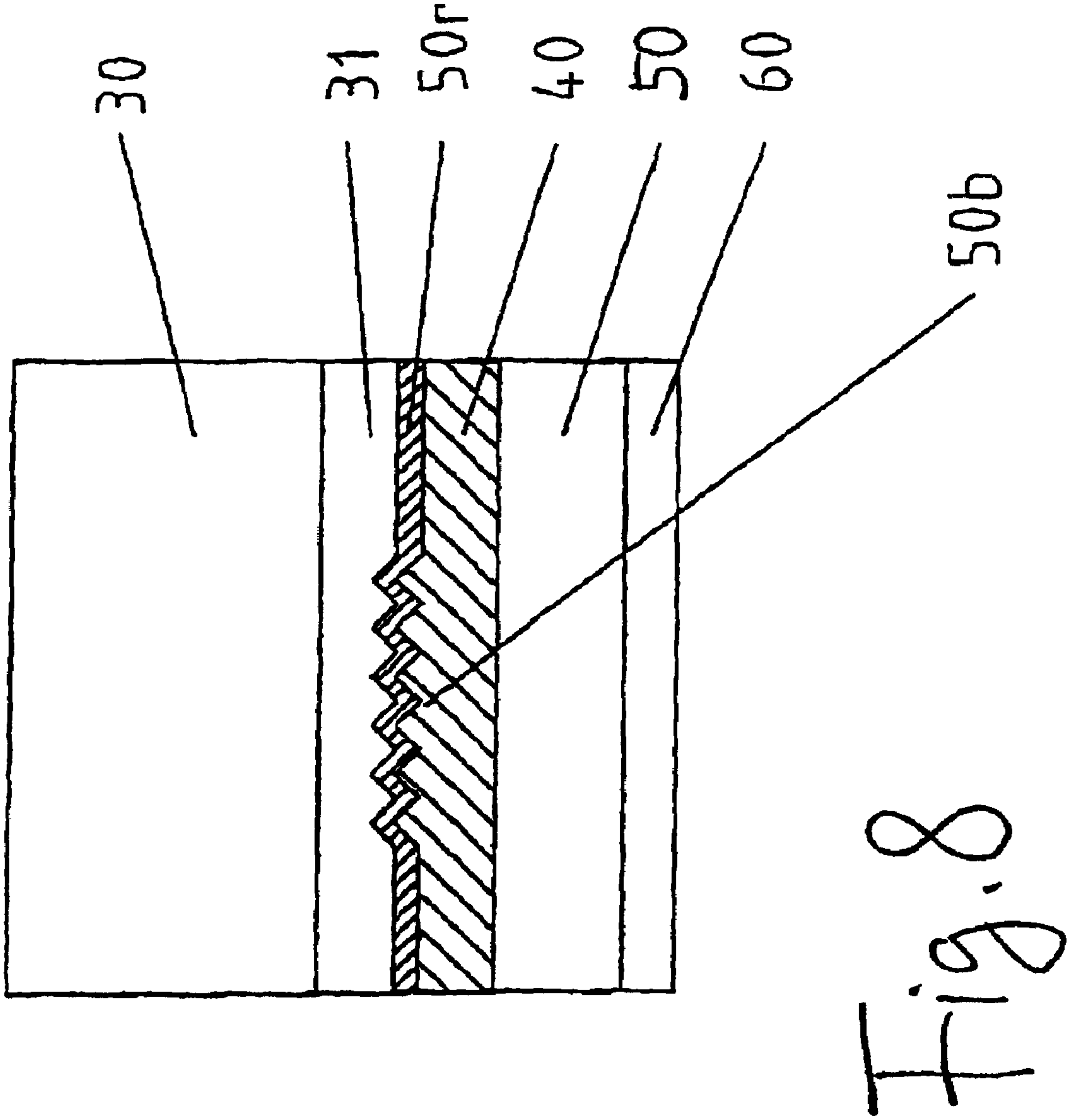
Figure 9:
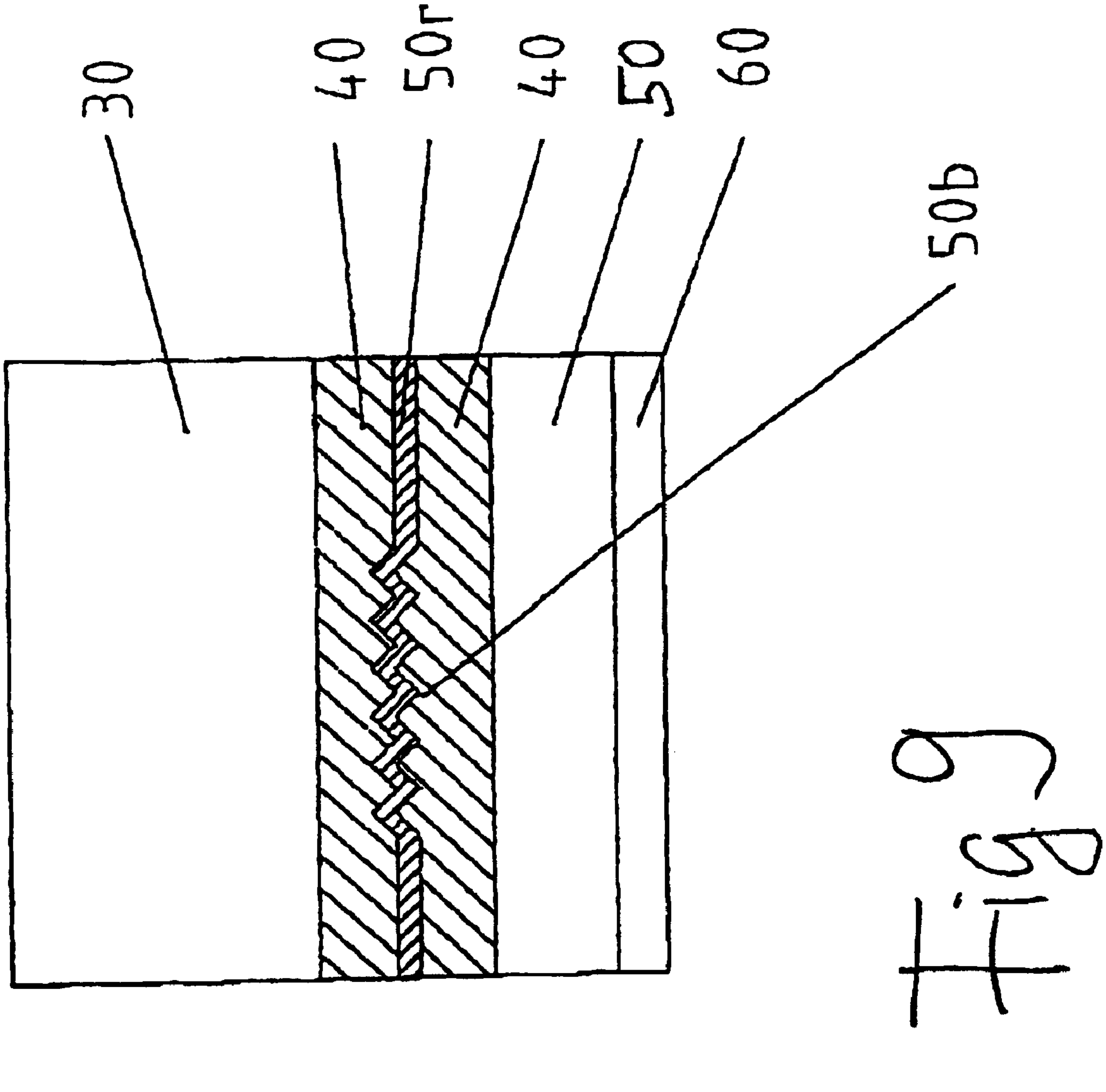

FIGS. 7 to 9 show laminating films which in their layer structure correspond to the transfer films in FIGS. 5 and 6. The overlay film 30 corresponds to the protective layer 3. The other layers: the laser-sensitive layer 40, the background layer 50, the reflection layer 50*r* and the adhesive layer 60 correspond to the laser-sensitive layer 4, the background layer 5, the reflection layer 5*r* and the adhesive layer 6 respectively. In a corresponding fashion, the laminating films of FIGS. 8 and 9 also have a diffraction and/or hologram structure 50*b* corresponding to the diffraction and/or hologram structure 5*b* in FIGS. 5 and 6.

Figure 10:
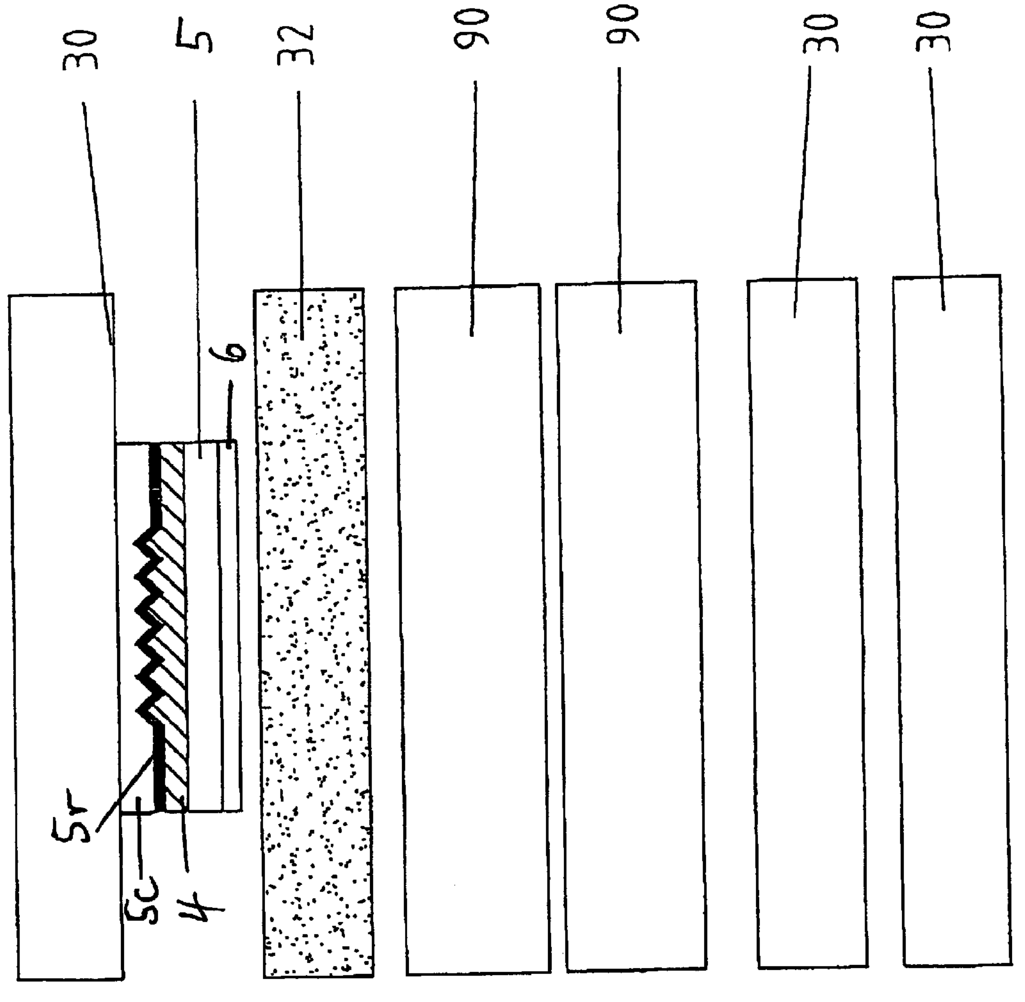
FIG. 10 shows an exploded view of a card body laminated from various overlay films and inlets.

In the embodiment of FIG. 10 the multi-layer body is in the form of a body laminated from various overlay films and inlets. The upwardly arranged overlay film 30 has at its underside a plurality of layers which are applied by applying a transfer film to the overlay film. These layers involve a lacquer layer 5*c*, a reflection layer 5*r*, a laser-sensitive layer 4, a background layer 5 and an adhesive layer 6. A diffraction and/or hologram structure 5*b* is provided in the region of the lacquer layer 5*c*, the reflection layer 5*r* and the laser-sensitive layer 4.

Arranged beneath that film composite is an overlay film 32 which comprises material doped with carbon and/or carbon black. This doped overlay film is a second laser-sensitive layer. Carbonisation takes place in that layer under a corresponding laser effect, whereby, when the laser conditions are suitably adjusted, it is possible to obtain a gray scale marking.

Arranged beneath that doped overlay film 32 are inlets 90 which, in the illustrated embodiment, can comprise paper material. Arranged on the lower side of the lower inlet is an overlay film 30 and thereupon a further overlay film 30.

In order to produce the laser-induced marking in the laser-induced layer, laser irradiation is preferably effected when the coating or film is applied to the substrate. Alternatively however the laser irradiation operation can also be carried out prior to the application procedure, that is to say therefore immediately by irradiation of the film alone. Full-color image production, that is to say the production of a laser-induced marking in the form of a full-color image, can be implemented in embodiments in which the laser-sensitive material consists of a mixture of a cyan pigment component, a magenta pigment component and a yellow pigment component. The composition of the layers for a hot stamping foil is set forth for such an embodiment at the end of the description.

In the bleaching operation, a blue or green or red color marking is produced, in a first step, by that location being irradiated with a given laser wavelength with which a given pigment component is bleached.

In order to produce the color blue, only the yellow pigment component may be bleached. Blue laser light is used for that purpose. A given minimum intensity is required for the bleaching procedure. In addition a certain pulse duration is not to be exceeded. In order to obtain a green color marking in the first step, only the magenta pigment component may be bleached. Green laser light is used for that purpose. In order to obtain a red color marking in the first stage, only the cyan pigment component may be bleached. Red laser light is used for that purpose.

In order at that location to produce a color marking of the color cyan or magenta or yellow, that location is subjected to laser treatment in a second step, more specifically using a laser wavelength with which a pigment component which is not yet bleached at that location is bleached. If a blue color marking has been produced in the first step, the cyan pigment component and the magenta pigment component are unbleached at that location. In order to produce the color cyan at that location, the magenta pigment component has to be bleached in this second step. That is effected with green laser light. That therefore produced a cyan-colored marking at that location.

If in the second step, instead of that cyan-colored marking, a magenta-colored marking is to be produced, then the blue color marking produced in the first step has to be treated with red laser light.

In that way the cyan pigment is bleached at that location so that therefore the magenta pigment remains unbleached at that location. Therefore there is the magenta-colored marking at that location.

In a corresponding manner a cyan-colored marking or a yellow-colored marking can be produced from a green color marking which was produced in the first step and which was formed from remaining unbleached cyan pigment and yellow pigment, more specifically by treatment with blue laser light and red laser light respectively.

In a corresponding manner, in the second step a red color marking produced in the first step can be converted into a yellow or magenta-colored marking, more specifically by laser treatment in the second step with green laser light or blue laser light respectively.

In order to obtain a transparent location at the location treated in the first and second steps, that is to say to obtain a white location if the background layer 5 is white, that location has to be treated in a third step with a laser beam whose wavelength is so adjusted that the pigment component which has remained unbleached at that location after the second step is bleached, that is to say the yellow color marking has to be bleached with blue laser light, the magenta-colored marking with green light and the cyan-colored marking with red laser light.

Further adjacent locations are then treated in the laser-sensitive layer 4 in the same manner in order to produce further color markings in the layer 4 of the stamping film. In that way it is possible to produce a full-color image.

Laser treatment can also be used to produce color markings or a full-color image in the coloring agent or agents in the laser-sensitive layer by a color change. The laser treatment can be effected in a corresponding manner with successive process steps. Pigments are involved as coloring agents, that is to say substances for imparting color. The pigments are generally insoluble and are usually inorganic substances. However mostly soluble, organic coloring agents can also be used as the coloring agents. The color change is effected in each case with specific laser conditions which are then applied in the individual steps in the laser treatment.

The described bleaching and color conversion process can also be used in a corresponding manner when the laser-sensitive material comprises only one or two coloring agent components. It is also possible to use other coloring agent components and other laser wavelength ranges, in the laser treatment.

The laser treatment of the transfer film for producing the color markings can alternatively also be effected prior to applying the film, more especially in particular when the protective layer 3 is in the form of a layer which is not or is only partially transparent in relation to the laser radiation or is in the form of a layer which is not transparent for laser radiation in the given wavelength range, or if there is provided an additional UV-absorbent protective layer. The laser treatment is then effected prior to application of the film, in that the laser beam is directed on to the rear side of the film, that is to say on to the background layer 5 or the adhesive layer 6, and thus the laser-sensitive layer 4 is treated from the other side, in order to produce the color markings therein, in the same manner. The background layer 5 and the adhesive layer 6 in these uses are transparent or at least partly transparent in relation to the laser radiation in question or are applied only in partial regions.

The layers 2-6 can be produced in accordance with the following composition:

| | |
|---|---|
| Release layer (separation layer): | |
| toluene | 99.5 parts |
| ester wax (dropping point 90° C.) | 0.5 parts |
| Protective layer 3 (protective lacquer layer): | |
| methylethylketone | 61.0 parts |
| diacetone alcohol | 9.0 parts |
| methylmethacrylate (Tg = 122° C.) | 18.0 parts |
| polyethylene dispersion (23% in xylene) (softening point 140° C.) | 7.5 parts |
| high-molecular dispersing additive (40%, amino number 20) | 0.5 parts |
| extender (aluminum silicate) | 4.0 parts |
| Laser-sensitive layer 4 (first color lacquer layer): | |
| methylethylketone | 34.0 parts |
| toluene | 26.0 parts |
| ethylacetate | 13.0 parts |
| cellulose nitrate (low viscosity, 65% in alcohol) | 20.0 parts |
| linear polyurethane (Fp > 200° C.) | 3.5 parts |
| high-molecular dispersing additive (40%, amino number 20) | 2.0 parts |
| e.g. Pigment Blue 15:4 | 0.5 parts |
| Pigment Red 57:1 | 0.5 parts |
| Pigment Yellow 155 | 0.5 parts |
| Background layer 5 (second color layer lacquer): | |
| methylethylketone | 40.0 parts |
| toluene | 22.0 parts |
| ethylene vinylacetate terpolymer (Fp = 60° C.) | 2.5 parts |
| polyvinylchloride (Tg: 89° C.) | 5.5 parts |
| polyvinylchloride (Tg: 40° C.) | 3.0 parts |
| dispersing additive (50%, acid number 51) | 1.0 parts |
| titanium dioxide (d = 3.8–4.2 g/cm$^3$) | 26.0 parts |
| Adhesive layer 6: | |
| methylethylketone | 55.0 parts |
| toluene | 12.5 parts |
| ethanol | 3.5 parts |
| polyvinylacetate (softening point 80° C.) | 6.0 parts |
| butyl/methylmethacrylate (Tg: 80° C.) | 8.0 parts |
| ethylmethacrylate resin (Tg: 63° C.) | 3.0 parts |
| methacrylate copolymer (Tg: 80° C.) | 5.0 parts |
| unsaturated polyester resin (softening point 103° C.) | 3.5 parts |
| silicon dioxide | 3.5 parts |

What is claimed is:

1. A multi-layer body comprising a layer composite which is formed on a substrate, the layer composite comprising a plurality of layers including:

a first laser-sensitive layer having a first laser-sensitive material for forming laser-induced markings with a first laser radiation;

a first background layer associated with the first laser-sensitive layer, wherein the first background layer is positioned between the first laser-sensitive layer and the substrate, the first background layer comprising at least one of a reflecting and an absorbent material for the first laser radiation, wherein the first background layer is arranged and shaped to minimize transmission of the first laser radiation to at least that portion of the substrate beneath a portion of the first laser-sensitive layer in which markings are induced, thereby preventing substantial destruction of the substrate by the first laser radiation.

2. A multi-layer body as set forth in claim 1, wherein the plurality of layers are arranged in a common overlay film or in a plurality of overlay films.

3. A multi-layer body as set forth in claim 1, wherein the substrate is formed from at least one inlet.

4. A multi-layer body as set forth in claim 3, wherein the substrate or the at least one inlet is formed from paper material.

5. A multi-layer body as set forth in claim 1, wherein the multi-layer body is in the form of a body laminated from a plurality of films comprising at least one of an, overlay film and an inlet film.

6. A multi-layer body in the form of a transfer film, comprising a plurality of layers including at least one laser-sensitive layer having laser-sensitive material for forming laser-induced markings with a laser radiation; and at least one at least one background layer associated with the at least one laser-sensitive layer, the at least one background layer comprising at least one of a reflecting, an at least substantially non-transparent, and an absorbent material for the laser radiation used, wherein the at least one background layer at least in a partial region is positioned between the laser-sensitive layer and the substrate so that transmission of the laser radiation through the at least one background layer is minimized and substantial destruction of the substrate by the laser radiation is prevented.

7. A multi-layer body as set forth in claim 1, further comprising:

a second laser-sensitive layer having a second laser-sensitive material for forming laser-induced markings with a second laser radiation;

a second background layer associated with the second laser-sensitive layer, wherein the second background layer is positioned between the second laser-sensitive layer and the substrate, the second background layer comprising at least one of a reflecting and an absorbent material for the second laser radiation, wherein the second background layer is arranged and shaped to prevent transmission of the second laser radiation to at least that portion of the substrate beneath the portion of the second laser-sensitive layer in which markings are induced by the second laser radiation, thereby preventing substantial destruction of the substrate by the second laser radiation.

8. A multi-layer body as set forth in claim 1, wherein the first background layer positioned between the first laser-sensitive layer and the substrate is arranged beneath only the portion of the first laser-sensitive layer in which the laser-induced markings are formed with the first laser radiation.

9. A multi-layer body as set forth in claim 1, wherein the first background layer is proximate the first laser-sensitive layer associated therewith.

10. A multi-layer body as set forth in claim 1, wherein at least one intermediate layer is positioned between the first background layer and the first laser-sensitive layer associated therewith.

11. A multi-layer body as set forth in claim 7, wherein the second background layer is positioned between the first and the second laser-sensitive layers.

12. A multi-layer body as set forth in claim 1, wherein the first laser-sensitive material comprises at least one of an agent which is bleachable, an agent able to change color and an agent blackenable by laser radiation.

13. A multi-layer body as set forth in claim 12 wherein the first laser-sensitive material comprises at least two different bleachable agents having different bleaching laser conditions, wherein only one of the at least two different bleachable agents is bleachable by the first laser radiation.

14. A multi-layer body as set forth in claim 12, wherein the first laser-sensitive material comprises at least one coloring agent providing one of a cyan, a magenta or a yellow color.

15. A multi-layer body as set forth in claim 14, wherein the at least one coloring agent comprises at least one of a cyan pigment, a magenta pigment, and a yellow pigment, and wherein the cyan pigment is bleachable with red laser light, the magenta pigment is bleachable with green laser light, and the yellow pigment is bleachable with blue laser light.

16. A multi-layer body as set forth in claim 1, wherein the multi-layer body is in the form of a transfer film.

17. A multi-layer body as set forth in claim 16, wherein the multi-layer body is in the form of a hot stamping film.

18. A multi-layer body as set forth in claim 7, wherein the first background layer is at least one of transparent for light in the visible spectral range and transparent for the second laser radiation used to produce the laser-induced marking in the second laser-sensitive layer, and further wherein the first background layer is at least one of reflective and absorbent for the first laser radiation.

19. A multi-layered body, comprising a layer composite formed on a substrate, the layer composite comprising:

at least one laser-sensitive layer having laser-sensitive material for forming a laser-induced marking using an incident laser radiation;

at least one background layer associated with the at least one laser-sensitive layer, wherein the at least one background layer at least in a partial region is positioned between the at least one laser-sensitive layer in which the laser-induced marking is formed and the substrate, the at least one background layer comprising at least one of a reflecting, and an absorbent material for the incident laser radiation to minimize transmission of the incident laser radiation through the at least one background layer and thereby preventing substantial destruction of the substrate by the incident laser radiation.

20. A multi-layered body as set forth in claim 19, wherein the multilayered body is in the form of one of a transfer film and a laminating film.

* * * * *

UNITED STATES PATENT AND TRADEMARK OFFICE

CERTIFICATE OF CORRECTION

PATENT NO. : 7,220,479 B2
APPLICATION NO. : 10/513623
DATED : May 22, 2007
INVENTOR(S) : Lutz et al.

It is certified that error appears in the above-identified patent and that said Letters Patent is hereby corrected as shown below:

TITLE PAGE:

Item (73) Assignees: now reads “Leonard Kurz GmbH & Co., KG” should read -- Leonhard Kurz GmbH & Co., KG --.

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,220,479 B2
APPLICATION NO. : 10/513623
DATED : May 22, 2007
INVENTOR(S) : Lutz et al.

It is certified that error appears in the above-identified patent and that said Letters Patent is hereby corrected as shown below:

TITLE PAGE:

Item (73) Assignees: now reads "Leonard Kurz GmbH & Co., KG" should read -- Leonhard Kurz GmbH & Co., KG --.

Signed and Sealed this

Twenty-first Day of August, 2007

JON W. DUDAS
*Director of the United States Patent and Trademark Office*